(12) United States Patent
Minami

(10) Patent No.: US 6,651,114 B1
(45) Date of Patent: Nov. 18, 2003

(54) DMA CONTROLLER WHICH OPTIMIZES TRANSFER RATE OF DATA AND METHOD THEREFOR

(75) Inventor: Toshiaki Minami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 09/718,189

(22) Filed: Nov. 21, 2000

(30) Foreign Application Priority Data

Nov. 25, 1999 (JP) .......................................... 11-334683

(51) Int. Cl.[7] .............................................. G06F 13/28
(52) U.S. Cl. .......................................... 710/22; 710/52
(58) Field of Search ................................. 710/22, 52

(56) References Cited

U.S. PATENT DOCUMENTS

| | | | | |
|---|---|---|---|---|
| 4,847,750 A | * | 7/1989 | Daniel ........................ | 710/26 |
| 5,111,425 A | * | 5/1992 | Takeuchi et al. ............... | 710/22 |
| 5,381,538 A | * | 1/1995 | Amini et al. ................. | 711/156 |
| 5,594,923 A | * | 1/1997 | Inoue et al. .................. | 710/22 |
| 5,974,480 A | * | 10/1999 | Qureshi et al. ................ | 710/27 |
| 6,151,654 A | * | 11/2000 | Poisner et al. ............... | 710/240 |
| 6,408,346 B1 | * | 6/2002 | Jirgal ........................... | 710/25 |

* cited by examiner

Primary Examiner—Jeffrey Gaffin
Assistant Examiner—Justin Knapp
(74) Attorney, Agent, or Firm—Robin, Blecker & Daley

(57) ABSTRACT

A DMA controller is arranged to transfer data in units of one byte, one by one, by hand shaking when a transfer request signal is asserted by a low-speed I/O device, and is arranged to continuously transfer data of a predetermined number of transfer units when a burst request signal is asserted by a high-speed I/O device. The burst request signal may be replaced with a number-of-transfer-bytes information signal to continuously transfer data of a number of transfer bytes designated by the number-of-transfer-bytes information signal. Accordingly, a rate of data transfer between an I/O bus and a system bus can be optimized according to the kind of an I/O device connected to the I/O bus.

20 Claims, 12 Drawing Sheets

DMA CONTROLLER WHICH OPTIMIZES TRANSFER RATE OF DATA AND METHOD THEREFOR

BACKGROUND OF THE INVENTION

1. Field of the Invention

The present invention relates to a DMA controller and a control method therefor, and more particularly to a DMA controller arranged to transfer data between a main storage and an input-output (I/O) device and a control method for the DMA controller.

2. Description of Related Art

Direct memory access (DMA) is used in a computer system to transfer data between an I/O device and a main storage of the computer system. The DMA is also used for transferring the content of a certain range of the main storage to another range thereof.

The DMA is carried out by a DMA controller which operates independently of a CPU in a computer system. More specifically, the DMA controller has two functions. In one function, the DMA controller causes the I/O device to output data and writes the data into the main storage. In the other function, the DMA controller reads out data from the main storage and causes the I/O device to receive the data. Since other functions or tasks can be carried out by the CPU even while the DMA controller is in operation, the performance of the computer system including such a DMA controller can be greatly enhanced as a whole.

FIG. 2 shows, by way of example, the arrangement of a computer system using a DMA controller. Referring to FIG. 2, a CPU 110 is arranged to control the whole computer system. A system bus 100 is connected to the CPU 110 through a bus interface. A RAM 120 is arranged to serve as a main storage. A ROM 130 is arranged to store therein program-executing codes, etc. I/O devices 140, 150 and 160 are connected to the system bus 100 through system bus interfaces 141, 151 and 161, respectively, and are also connected to a DMA controller 180 through a control line 170. The DMA controller 180 is connected to the system bus 100 and is also connected to each of the I/O devices 140, 150 and 160 through the control line 170.

In the case of the example shown in FIG. 2, although the DMA controller 180 controls data transfer, data itself does not pass through the DMA controller 180. While the DMA controller 180 is arranged to issue reading and writing commands for data transfer, data moves directly between the main storage 120 and the I/O device 140, 150 or 160 through the system bus 100.

FIG. 3 shows, as another example, the arrangement of a computer system using a DMA controller. Referring to FIG. 3, a CPU 210 is connected to a system bus 200 through a bus interface. A RAM 220 is arranged to serve as a main storage. A ROM 230 is arranged to store therein program-executing codes, etc. I/O devices 240, 250 and 260 are connected to a DMA controller 280 through an I/O bus 270. The DMA controller 280 is connected to the system bus 200 and is also connected to the I/O devices 240, 250 and 260 through the I/O bus 270.

The I/O devices 240, 250 and 260 and the main storage 220 have different access speeds from each other. Therefore, an FIFO memory 290 is provided inside the DMA controller 280 for buffering the access speed.

In the case of the example shown in FIG. 3, while data transfer is controlled by the DMA controller 280, data itself is read from or written into the main storage (RAM) 220 through the system bus 200 and a bus interface of the DMA controller 280. Further, the data is transferred between the DMA controller 280 and the I/O devices 240, 250 and 260 through the I/O bus 270.

In this instance, in a case where the data width of the I/O device differs from the data width of the main storage, for example, in a case where the data width of the I/O device is 8 bits while the data width of the main storage is 32 bits, a converting action for the data width is performed by using the FIFO memory 290 provided in the DMA controller 280.

The FIFO memory 290 has a capacity of "width of 32 bits (per word)×an integer" and is arranged to permit masking at arbitrary bit positions in writing data (while keeping original information in the case of masking).

In a case where the direction of data transfer is from the main storage to the I/O device, as shown in FIG. 4, data is read out from the main storage word by word, i.e., 32 bits, at a time. The data thus read out is stored at the rearmost word place of the FIFO memory. Data of one foremost word (32 bits) of the FIFO memory is then selected, in four divided blocks, by a selector serially beginning with a byte (8 bits) of higher order one by one. The data read out and selected is thus transferred to one of the I/O devices.

In a case where the direction of data transfer is from the I/O device to the main storage, data is transferred as shown in FIG. 5. Referring to FIG. 5, every time data of one byte (8 bits) is received from the I/O device, the data is stored serially beginning with a byte of higher order within the rearmost word part of the FIFO memory. After that, the whole data of one word (32 bits) is stored by the lump into the main storage from the foremost part of the FIFO memory.

The DMA controller requests the right to gain access to the system bus and, then, acquires the right to gain access to the system bus. In a case where the capacity of the FIFO memory is equal to or more than one word (=4 bytes), data still can be transferred also from the I/O device to the DMA controller concurrently with the request and acquisition of the right to gain access until data is written into the main storage. Therefore, even in a case where a high-speed I/O device is connected, this arrangement permits a reduction in waiting time on the side of the I/O device, so that the possibility of occurrence of overrun of the I/O device can be suppressed. Further, since the frequency of writing into the main storage is reduced to one fourth, the efficiency of use of the system bus can be enhanced.

In a case where, as shown in FIGS. 4 and 5, the data width of the system bus is 32 bits while the data width of the I/O bus is 8 bits, data transfer between the DMA controller and each of the I/O devices is carried out in accordance with the following procedures.

In a case where the direction of data transfer is from the main storage to the I/O device, the procedures of data transfer are as follows. 1) One of the I/O devices to which the channel of DMA is to be allotted is first decided. 2) A request signal Req* requesting DMA transfer is asserted by the I/O device to which the DMA channel is allotted. 3) In reply to the request signal Req*, an acknowledgement signal Ack* is immediately sent from the DMA controller to the I/O device if there is data in the FIFO memory. If the FIFO memory is vacant, the DMA controller reads out data of one word from the main storage and stores the data into the FIFO memory. After that, the DMA controller sends an acknowledgement signal Ack* to the I/O device. 4) Concurrently with the acknowledgement signal Ack*, data of one byte is driven onto the I/O bus by the DMA controller. The I/O device takes the data in. 5) The steps 2), 3) and 4) of the procedures are repeated a number of times corresponding to a length of DMA transfer set by the CPU.

In a case where the direction of data transfer is from the I/O device to the main storage, the procedures of data transfer are as follows. 1) One of the I/O devices to which the DMA channel is to be allotted is first decided. 2) A request signal Req* requesting DMA transfer is asserted by the I/O device to which the DMA channel is allotted. Then, data of one byte is driven onto the I/O bus by the I/O device. 3) If the FIFO memory has a vacancy, an acknowledgement signal Ack* is immediately sent from the DMA controller to the I/O device. If the FIFO memory is full and has no vacancy, the DMA controller waits for occurrence of a vacancy in the FIFO memory with writing of data into the main storage finished. After that, the acknowledge signal Ack* is sent to the I/O device. 4) The DMA controller causes data on the I/O bus to be stored into the FIFO memory. If the content of the FIFO memory is equal to or more than one word, the DMA controller continues to write data into the main storage until the content of the FIFO memory becomes less than one word. 5) The steps 2), 3) and 4) of the procedures are repeated a number of times corresponding to a length of DMA transfer set by the CPU.

In a case where data transfer is made while performing hand shaking using the two signals Req* and Ack* between the DMA controller and the I/O device in the above-stated manner, the data transfer rate obtainable by a perfect-synchronized-type design can be suppressed at the most to a transfer rate of "(I/O bus width)×(system clock signal frequency)×½".

In other words, with the system clock signal frequency assumed to be 25 MHz, since the I/O bus width is 8 bits, a maximum transfer rate between the DMA controller and the I/O device is 100 Mbit/sec.

On the other hand, since the system bus width is 32 bits, with the average delay time of reading or writing from or into the main storage at a time assumed to be four cycles of a clock signal, the transfer rate is 200 Mbit/sec.

The conventional arrangement described above presents no problem for a case where an I/O device, such as a floppy disk controller, having a maximum transfer rate at a relatively low rate is connected. However, in a case where an I/O device, such as a high-speed hard disk controller or a controller of IEEE 1394, having a maximum transfer rate exceeding 100 Mbit/sec is connected, it becomes necessary to have an FIFO memory of a sufficient capacity arranged on the side of the I/O device. Without such an FIFO memory, an insufficient transfer rate between the DMA controller and the I/O device might become a bottleneck to hinder adequate performance.

BRIEF SUMMARY OF THE INVENTION

In view of the problem of the prior art, it is an object of the invention to provide a DMA controller arranged to optimize the transfer rate of data transfer between a main storage and an I/O device according to a device connected to an I/O bus, and also to provide a control method for the DMA controller.

It is another object of the invention to provide a DMA controller arranged to optimize the transfer rate of data transfer between a main storage and an I/O device according to a request made by the I/O device, and also to provide a control method for the DMA controller.

To attain the above objects, in accordance with an aspect of the invention, there is provided a DMA controller arranged to transfer data between a main storage connected to a system bus and an I/O device connected to an I/O bus, the DMA controller comprising an FIFO memory arranged to buffer a difference in transfer speed between the system bus and the I/O bus, first transfer means for transferring data between the main storage and the FIFO memory through the system bus, request receiving means for receiving from the I/O device a request for transfer by DMA, second transfer means for transferring data of one transfer unit between the FIFO memory and the I/O device through the I/O bus when a request for normal transfer by DMA is received by the request receiving means, and third transfer means for continuously transferring data of a predetermined number of transfer units between the FIFO memory and the I/O device through the I/O bus when a request for continuous transfer by DMA is received by the request receiving means.

Further, to attain the above objects, in accordance with another aspect of the invention, there is provided a control method for a DMA controller arranged to transfer data between a main storage connected to a system bus and an I/O device connected to an I/O bus through an FIFO memory arranged to buffer a difference in transfer speed between the system bus and the I/O bus, the control method comprising a first transfer step of transferring data between the main storage and the FIFO memory through the system bus, a request receiving step of receiving from the I/O device a request for transfer by DMA, a second transfer step of transferring data of one transfer unit between the FIFO memory and the I/O device through the I/O bus when a request for normal transfer by DMA is received in the request receiving step, and a third transfer step of continuously transferring data of a predetermined number of transfer units between the FIFO memory and the I/O device through the I/O bus when a request for continuous transfer by DMA is received in the request receiving step.

Other objects and advantages of the invention will become apparent to those skilled in the art from the following detailed description of preferred embodiments thereof. In the description, reference is made to the accompanying drawings, which form a part of the invention and which illustrate, by way of example, the invention. The examples, however, are not exhaustive of the various embodiments of the invention and, therefore, reference is made to the claims which follow the description for determining the scope of the invention.

DETAILED DESCRIPTION OF THE INVENTION

Hereinafter, preferred embodiments of the invention will be described in detail with reference to the drawings.

First Embodiment

Figure 1:
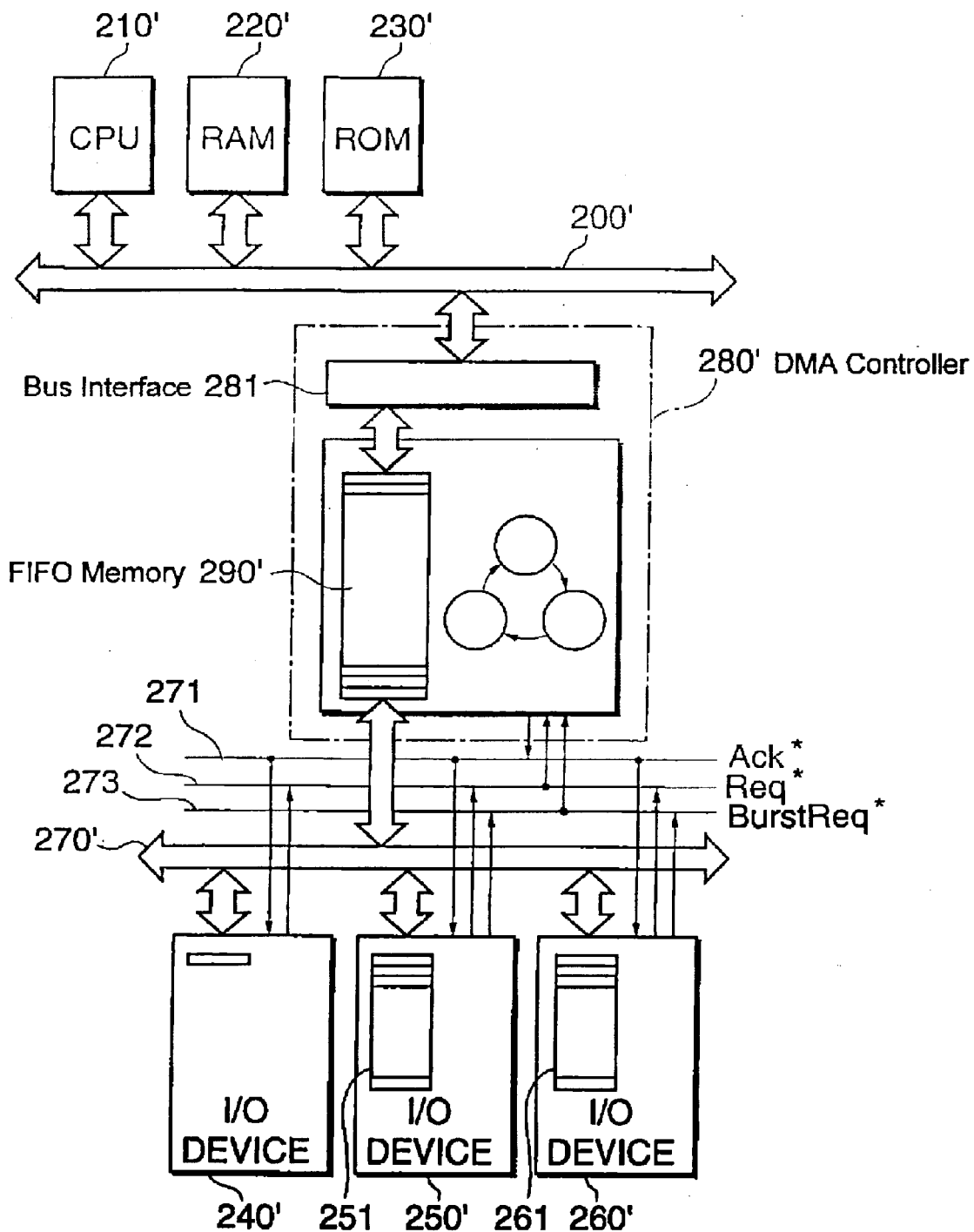
FIG. 1 is a diagram showing the arrangement of main parts of a DMA controller according to a first embodiment of the invention, in relation to peripheral devices connected thereto.
Figure 2:
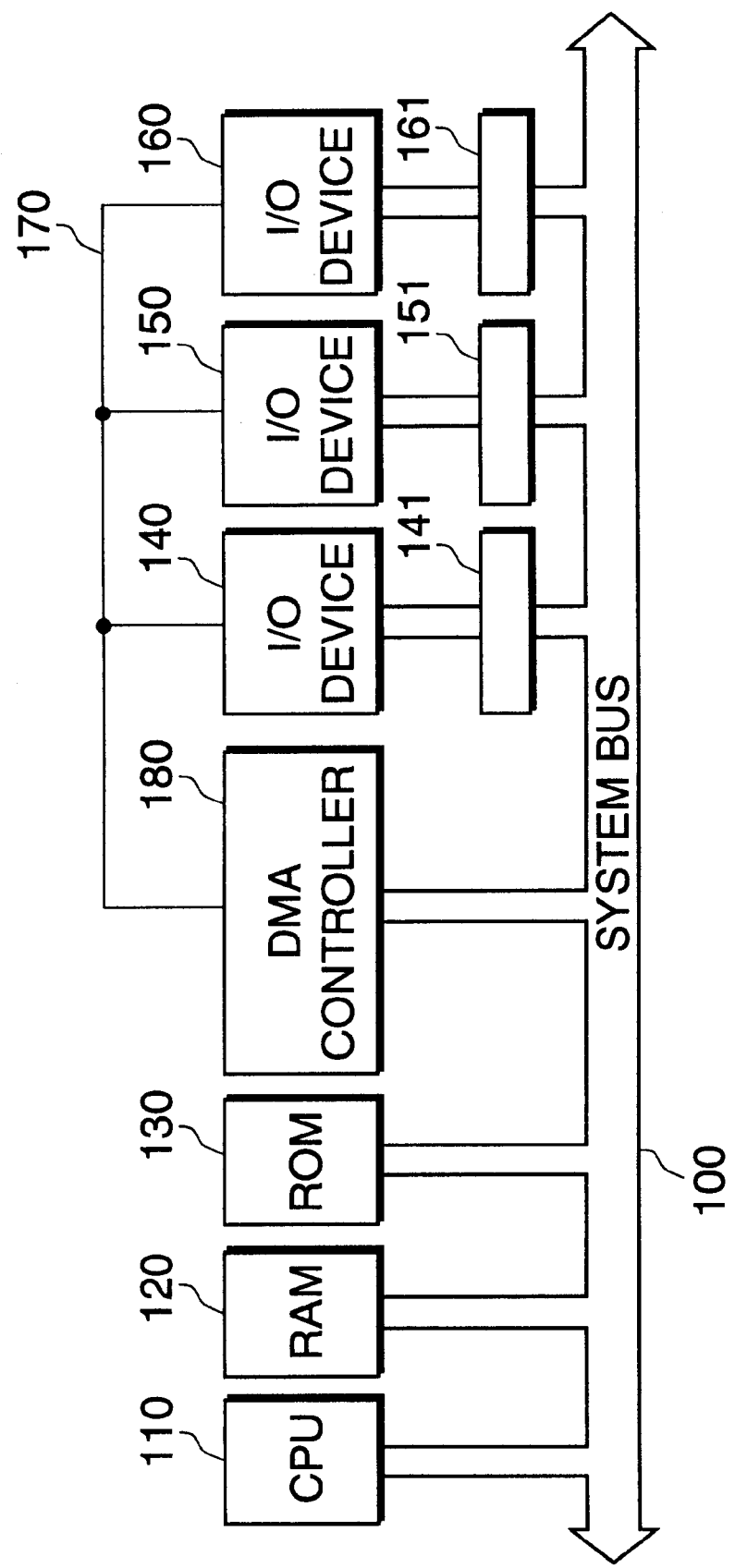
FIG. 2 a diagram showing, by way of example, the arrangement of a conventional computer system.
Figure 3:
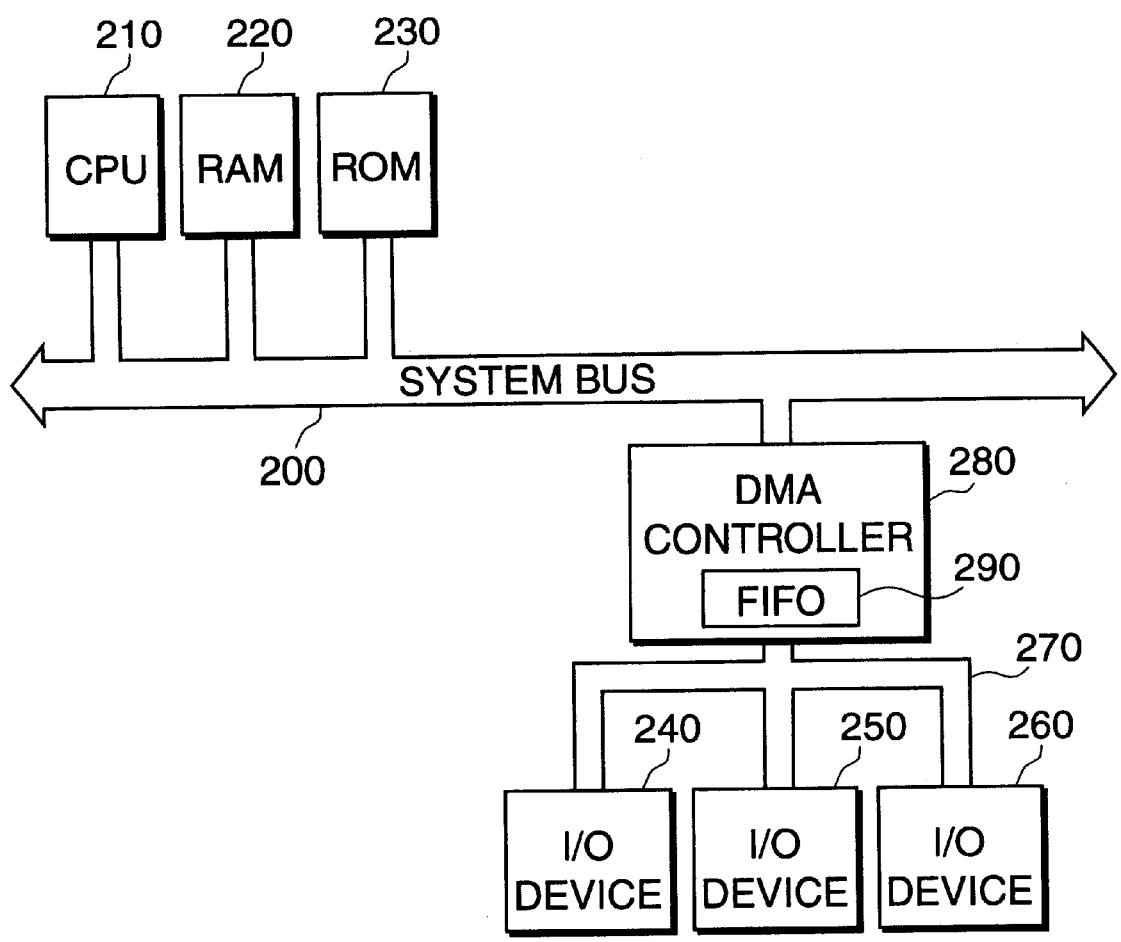
FIG. 3 a diagram showing, by way of example, the arrangement of another conventional computer system.
Figure 4:
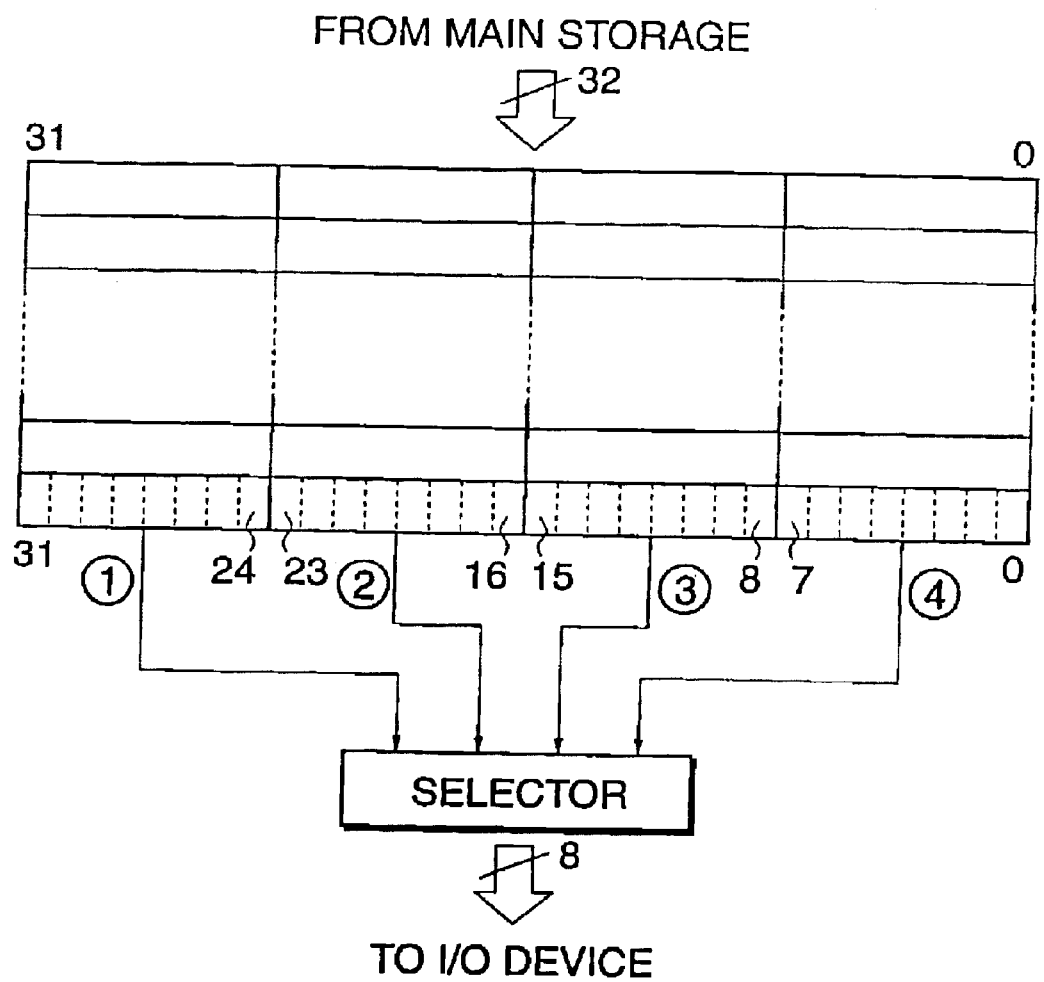
FIG. 4 a diagram showing the manner of converting the data width in transmitting data from a main storage to an I/O device through an FIFO memory.
Figure 5:
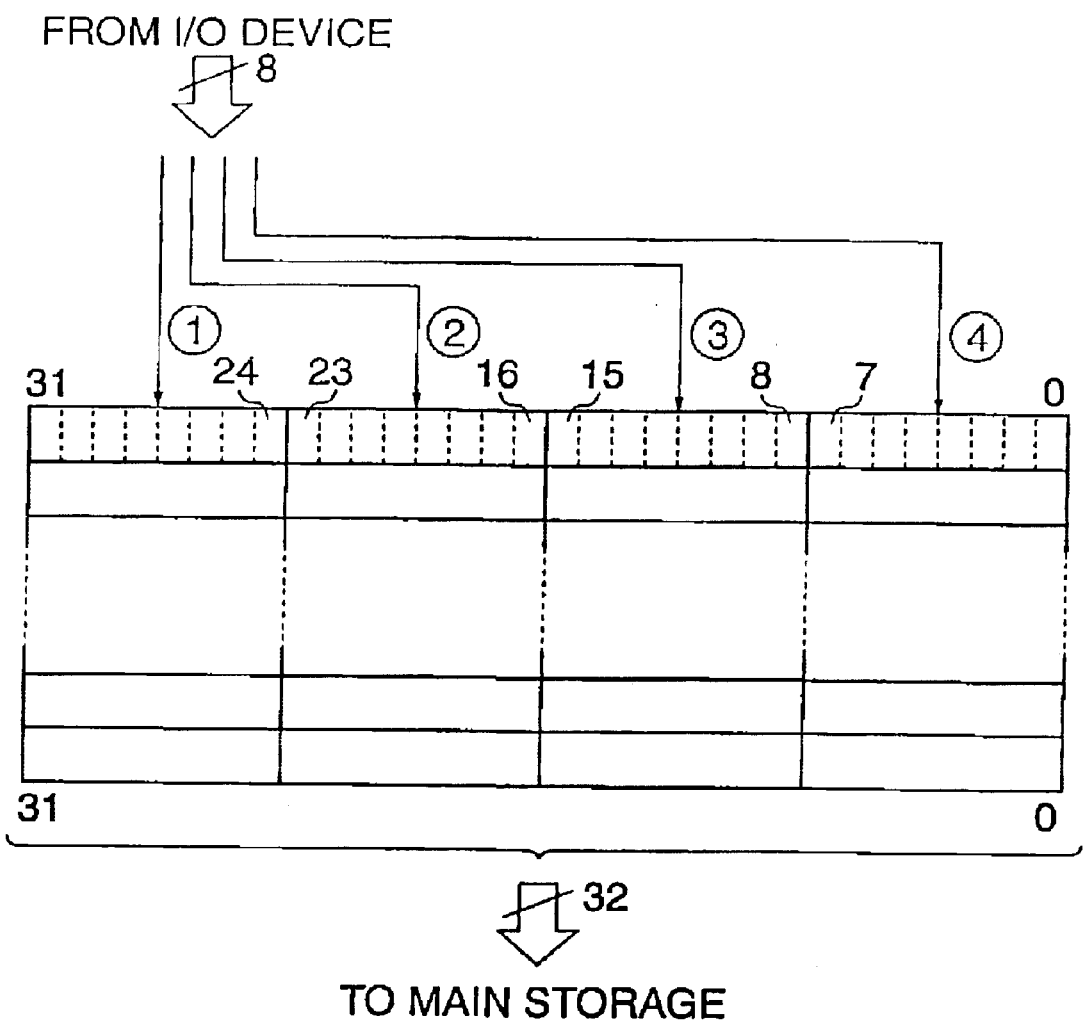
FIG. 5 a diagram showing the manner of converting the data width in transmitting data from the I/O device to the main storage through the FIFO memory.

FIG. 1 is a diagram showing the arrangement of main parts of a DMA controller according to a first embodiment of the invention, in relation to peripheral devices connected thereto. In FIG. 1, component elements which are substantially similar to those shown in FIG. 3 are denoted by the same reference numerals having apostrophe (') affixed thereto as those in FIG. 3.

Referring to FIG. 1, a CPU 210' is connected to a system bus 200' through a bus interface. A RAM 220' is arranged to serve as a main storage. A ROM 220' is arranged to store therein program-executing codes, etc. A DMA controller 280' is connected to the system bus 200' through a bus interface 281 and is also connected to I/O devices 240', 250' and 260' through an I/O bus 270'. In FIG. 1, a signal Ack* (271) is an acknowledgement signal issued in reply to a request for transfer by DMA (DMA transfer request). A signal Req* (272) is a signal indicative of the DMA transfer request. A signal BurstReq* (273) is a signal indicative of a request for continuous transfer by DMA (DMA continuous transfer request), which is additionally provided in the first embodiment. An FIFO memory 290' is arranged to be used for buffering or absorbing a speed difference.

Each of the I/O devices 240', 250' and 260' is connected to the DMA controller 280' through the I/O bus 270', a line for the signal Ack* (271) and a line for the signal Req* (272). Further, each of the I/O devices 250' and 260' is connected to the DMA controller 280' also through a line for the signal BurstReq* (273). Of the three I/O devices 240', 250' and 260', the I/O device 240' has a low access speed and is provided with no FIFO memory. The I/O devices 250' and 260' have high access speeds and are thus provided respectively with FIFO memories 251 and 261, which are of sufficient capacities to permit high-speed input and output from and to external devices in a cycle of clock which is not synchronous with a system clock signal.

With the construction described above, data is transferred by DMA. The DMA transfer of data between the main storage 220' and the low-speed I/O device 240' is first described as follows. In the system in the first embodiment, a DMA channel is assumed to be allotted selectively to the I/O device 240' by a setting operation performed at the CPU 210', for the sake of simplification of the description.

Figure 6:
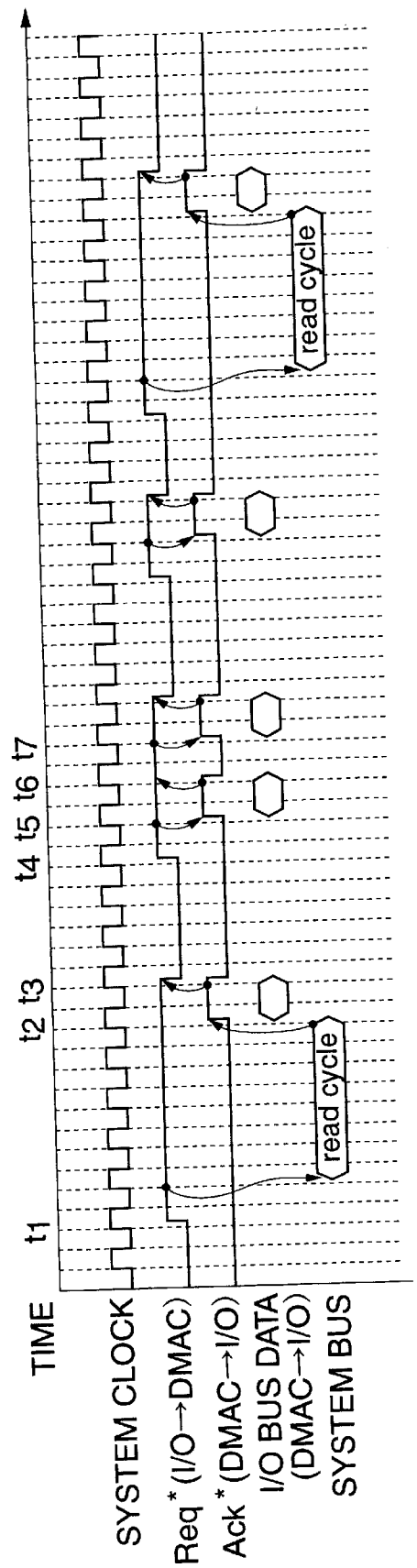
FIG. 6 is a timing chart showing data transfer made from a main storage to an I/O device operating at a low speed, in the first embodiment.

FIG. 6 is a timing chart showing the DMA transfer of data in a case where the direction of data transfer is from the main storage 220' to the low-speed I/O device 240'.

Referring to FIG. 6, at a time point t1, the I/O device 240' asserts the request signal Req* (272) requesting the DMA data transfer. The FIFO memory 290' is empty at this point of time. The DMA controller 280', therefore, reads data of one word through the system bus 200' and stores the data of one word in the FIFO memory 290'. At a time point t2, the DMA controller 280' asserts the acknowledgement signal Ack* (271) to the I/O device 240' and drives data of one byte onto the I/O bus 270'. When the I/O device 240' recognizes the signal Ack* (271) at the next rising edge of the system clock signal (at a time point t3), the I/O device 240' takes in the data driven on the I/O bus 270'. Then, since no request is made for the next transfer, the I/O device 240' negates the signal Req* (272).

At a time point t4, the I/O device 240' again asserts the request signal Req* (272) requesting the DMA data transfer. Since data has already been stored in the FIFO memory 290' by then, the DMA controller 280' immediately asserts the signal Ack* (271) to the I/O device 240' at the next rising edge of the system clock signal (at a time point t5) and drives data of one byte onto the I/O bus 270'. When the I/O device 240' recognizes the signal Ack* (271) at the next rising edge of the system clock signal (at a time point t6), the I/O device 240' takes in the data driven on the I/O bus 270'. Then, to request further transfer, the I/O device 270' continues to assert the signal Req* (272). The DMA controller 280' asserts the signal Ack* (272) to the I/O device 240' immediately at the next rise of the clock signal (at a time point t7) and drives data of one byte onto the I/O bus 270'.

Data is thus transferred, one byte at a time, by carrying on hand shaking between the DMA controller 280' and the I/O device 240'. Therefore, the speed of data transfer becomes, at the most, "(I/O bus width=8 bits) ×(system clock signal frequency)×½".

Figure 7:
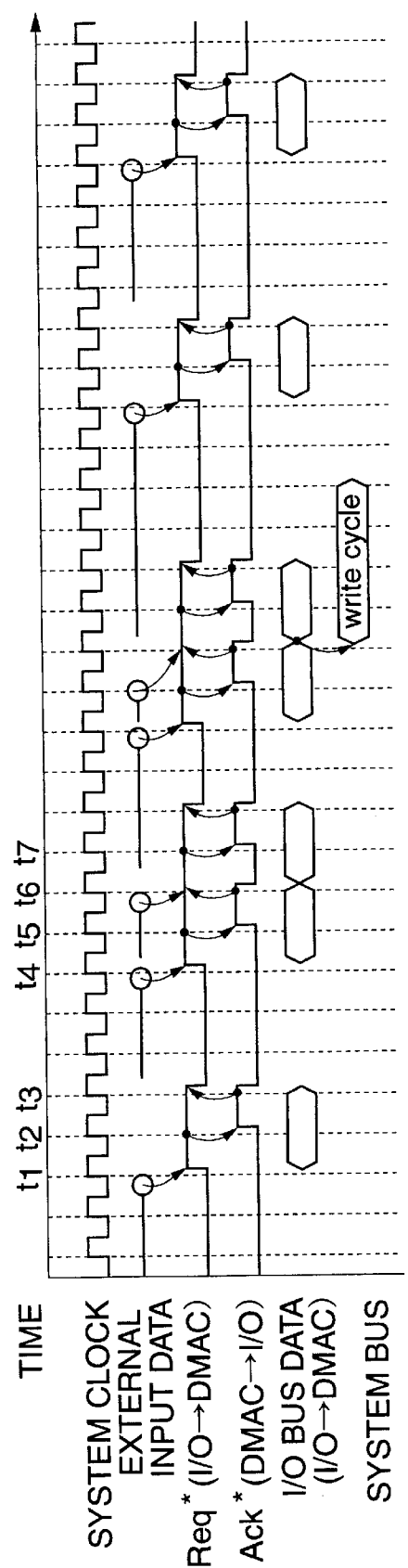
FIG. 7 is a timing chart showing data transfer made from the I/O device operating at a low speed to the main storage, in the first embodiment.

FIG. 7 is a timing chart showing the DMA transfer of data in a case where the direction of data transfer is from the low-speed I/O device 240' to the main storage 220'.

Referring to FIG. 7, when data of one byte is received from outside, the I/O device 240' asserts, at a time point t1, the signal Req* (272) requesting the DMA data transfer. At the same time, the I/O device 240' drives data of one byte onto the I/O bus 270'. Since the FIFO memory 290' is empty at that time, the DMA controller 280' asserts the signal Ack* (271) to the I/O device 240' at the next rise of the clock signal (at a time point t2) and, at the same time, takes in the data driven on the I/O bus 270' to store the data into the FIFO memory 290'. When the I/O device 240' recognizes the signal Ack* (271) at the next rise of the clock signal (at a time point t3), the I/O device 240' negates the signal Req* (272) because no next request is made for the DMA data transfer.

When the next data of one byte is received from outside, the I/O device 240' again asserts the signal Req* (272) requesting the DMA data transfer and, at the same time, drives data of one byte onto the I/O bus 270'. Since the FIFO memory 290' has not been filled with data as yet at that time, the DMA controller 280' asserts the signal Ack* (271) to the I/O device 240' immediately at the next rise of the clock signal (at a time point t5) and stores the data of one byte driven on the I/O bus 270' into the FIFO memory 290'.

During this time, the I/O device 240' receives the next data of one byte from outside. Therefore, when the I/O device 240' recognizes the signal Ack* (271) at the next rise of the clock signal (at a time point t6), the I/O device 240' continues to assert the signal Req* (272) and drives the next data of one byte onto the I/O bus 270'. At the next rise of the clock signal (at a time point t7), the DMA controller 280' immediately asserts the signal Ack* (271) to the I/O device 240' and stores, into the FIFO memory 290', the data of one byte driven on the I/O bus 270'.

When data of one word comes to be stored in the FIFO memory 290' in the above-mentioned manner, the DMA controller 280' writes the data of one word into the main storage 220' through the system bus 200'.

Next, the DMA data transfer between the main storage 220' and the high-speed I/O device 250' (or 260') is described as follows.

Figure 8:
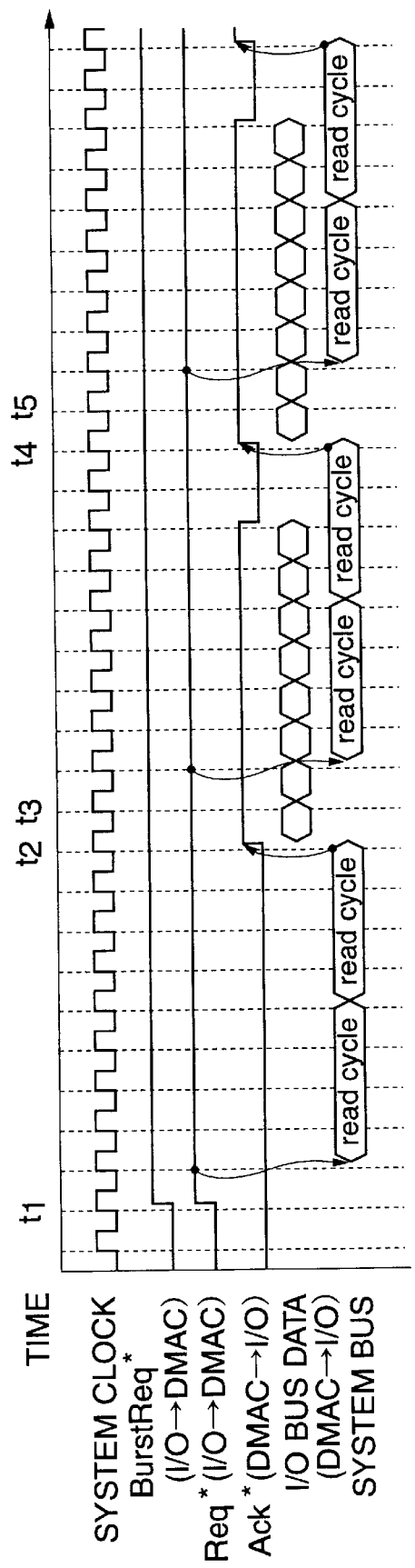
FIG. 8 is a timing chart showing data transfer made from the main storage to an I/O device operating at a high speed, in the first embodiment.

FIG. 8 is a timing chart showing the DMA transfer of data in a case where the direction of data transfer is from the main storage 220' to the high-speed I/O device 250' (the I/O device 260' is arranged to operate in the same manner as that shown in FIG. 8).

Referring to FIG. 8, at a time point t1, the I/O device 250' asserts the signal Req* (272) requesting the DMA data transfer and, at the same time, also assets the signal BurstReq* (273) requesting continuous data transfer. In the case of the first embodiment, data of 8 bytes are continuously transferred when the signal BurstReq* (273) is asserted.

Since the FIFO memory 290' is still empty at this point of time, the DMA controller 280' reads data of two words serially from the main storage 220' through the system bus 200' and stores the data of two words into the FIFO memory 290'. Then, beginning at a time point t2, continuously for a period of 8 cycles, the DMA controller 280' drives data onto the I/O bus 270' at a rate of one byte per cycle serially from data of lower order address in the main storage 220', while asserting the signal Ack* (271) to the I/O device 250'.

When the I/O device 250' recognizes the signal Ack* (271) at the next rising edge of the clock signal (at a time point t3), the I/O device 250' serially takes in the data driven on the I/O bus 270' continuously for a period of 8 cycles and stores the data into the FIFO memory 251 which is disposed inside the I/O device 250'. Since the amount of data is still insufficient after receipt of the data of 8 bytes, the I/O device 250' continues to assert the signal Req* (272) and the signal BurstReq* (273). Since the signal Req* (272) and the signal BurstReq* (273) are being continuously asserted even after the time point t3, the DMA controller 280' again reads data of two words from the main storage 220' through the system bus 200' and stores the data of two words into the FIFO memory 290'.

Then, beginning at a time point t4, continuously for a period of 8 cycles, the DMA controller 280' drives data onto the I/O bus 270' at a rate of one byte per cycle serially from data of lower order address in the main storage 220', while asserting the signal Ack* (271) to the I/O device 250'. When the I/O device 250' recognizes the signal Ack* (271) at the next rising edge of the clock signal (at a time point t5), the I/O device 250' serially takes in the data driven on the I/O bus 270' continuously for a period of 8 cycles and stores the data into the FIFO memory 251 which is disposed inside the I/O device 250'.

With the data transfer arranged to be made in the above-mentioned manner, data can be transferred between the DMA controller 280' and the I/O device 250' at a maximum rate of 8 bytes for a period of 10 cycles. Therefore, the data transfer rate becomes "(I/O bus width =8 bits)×(system clock signal frequency)×⅘".

In the first embodiment, if the I/O device 250' sends data to the outside when a total of 36 bytes of the data are stored in the FIFO memory 251, data of 4 bytes eventually remains untransferred after the transfer process is repeated 3 times. Since this data is less than the transfer length of 8 bytes obtained when the signal BurstReq* (273) is asserted, data of one byte is transferred four times by carrying out hand shaking with the signal Req* (272) and the signal Ack* (271) after the above-stated transfer process.

Figure 9:
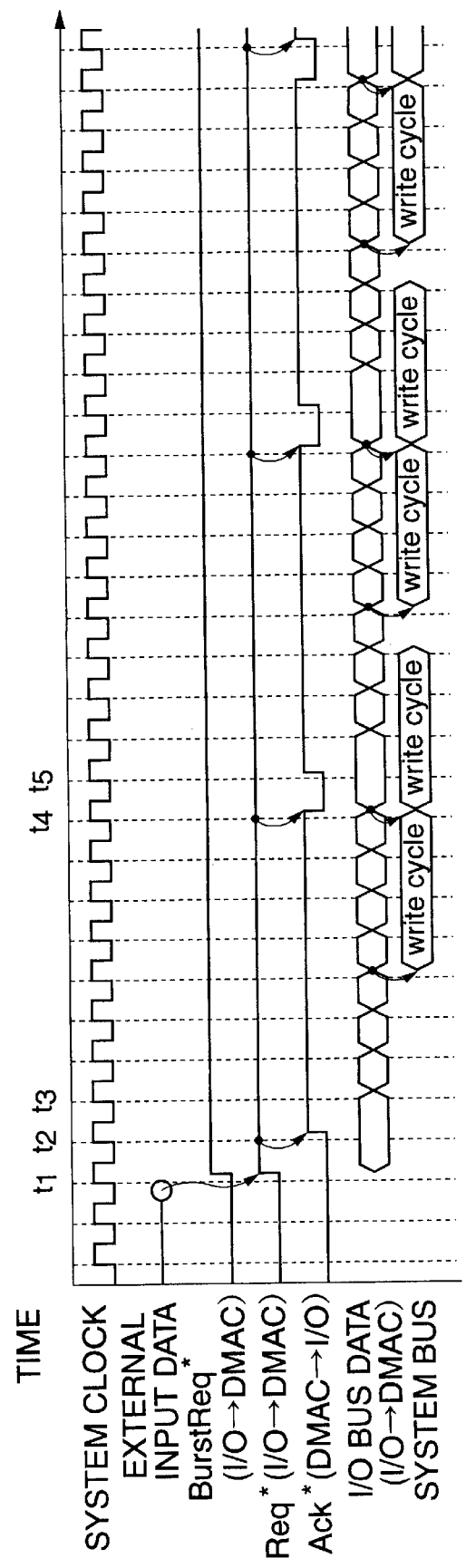
FIG. 9 is a timing chart showing data transfer made from the I/O device operating at a high speed to the main storage, in the first embodiment.

FIG. 9 is a timing chart showing the DMA transfer of data in a case where the direction of data transfer is from the high-speed I/O device 250' to the main storage 220'.

Referring to FIG. 9, when a data packet of 36 bytes is received from outside, the I/O device 250' asserts the signal Req* (272) and the signal BurstReq* (273) requesting the DMA data transfer at a time point t1. At the same time, the I/O device 250' reads from the internal FIFO memory 251 foremost data of one byte and drives the data onto the I/O bus 270'. Since the FIFO memory 2901 is empty at this time, the DMA controller 280' continuously acts for a period of 8 cycles, from the next rise of the clock signal (from a time point t2), to take in the data driven on the I/O bus 270' and to store the data into the FIFO memory 290', while asserting the signal Ack* (271) to the I/O device 250'.

When the I/O device 250' recognizes the signal Ack* (271) at the next rise of the clock signal (at a time point t3), the I/O device 250' drives the data in the FIFO memory 251 onto the I/O bus 270', over the next period of 7 cycles, serially from a foremost part of the data, one byte at a time. Then, the DMA controller 280' serially stores the data into the FIFO memory 290'. When the amount of data stored in the FIFO memory 290' comes to exceed 4 bytes (one word), the DMA controller 280' writes the data, one word at a time, through the system bus 200' into the main storage 220' from the foremost part of the FIFO memory 290'.

At a time point t4, the I/O device 250' continues to assert the signal Req* (272) and the signal BurstReq* (273) since there remains data of more than 8 bytes in the FIFO memory 251. In a case where the FIFO memory 290' of the DMA controller 280' has some vacancy for at least 8 bytes, the DMA controller 280' asserts the signal Ack* (271) to the I/O device 250' continuously for a period of 8 cycles from a time point t5.

With the above-mentioned process of data transfer repeated three times, data of 4 bytes remains untransferred. Since this data is less than the transfer length of 8 bytes obtained when the signal BurstReq* (273) is asserted, data of one byte is transferred four times by carrying out hand shaking with the signal Req* (272) and the signal Ack* (271) after the above-stated transfer process.

In the case of the first embodiment, when the signal BurstReq* (273) is asserted, the signal Req* (272) is also asserted at the same timing. This arrangement, however, of course may be changed to assert the signal BurstReq* (273) alone.

In the case of the first embodiment, when the signal BurstReq* (273) is asserted, the signal Ack* (271) is asserted continuously for a period of 8 cycles and, after that, a period of at least one cycle is provided before asserting the signal Ack* (271) next time. That arrangement, however, may be changed to continuously assert the signal Ack* (271) for "(a period of 8 cycles)×(an arbitrary number of times)", if the capacity of the FIFO memory 290' or the read/write cycle of the system bus 200' permits such an arrangement.

Further, in the case of the first embodiment, a plurality of I/O devices are connected to one channel of the DMA controller through the I/O bus. However, the number of I/O devices connected of course may be changed to one.

Second Embodiment

Figure 10:
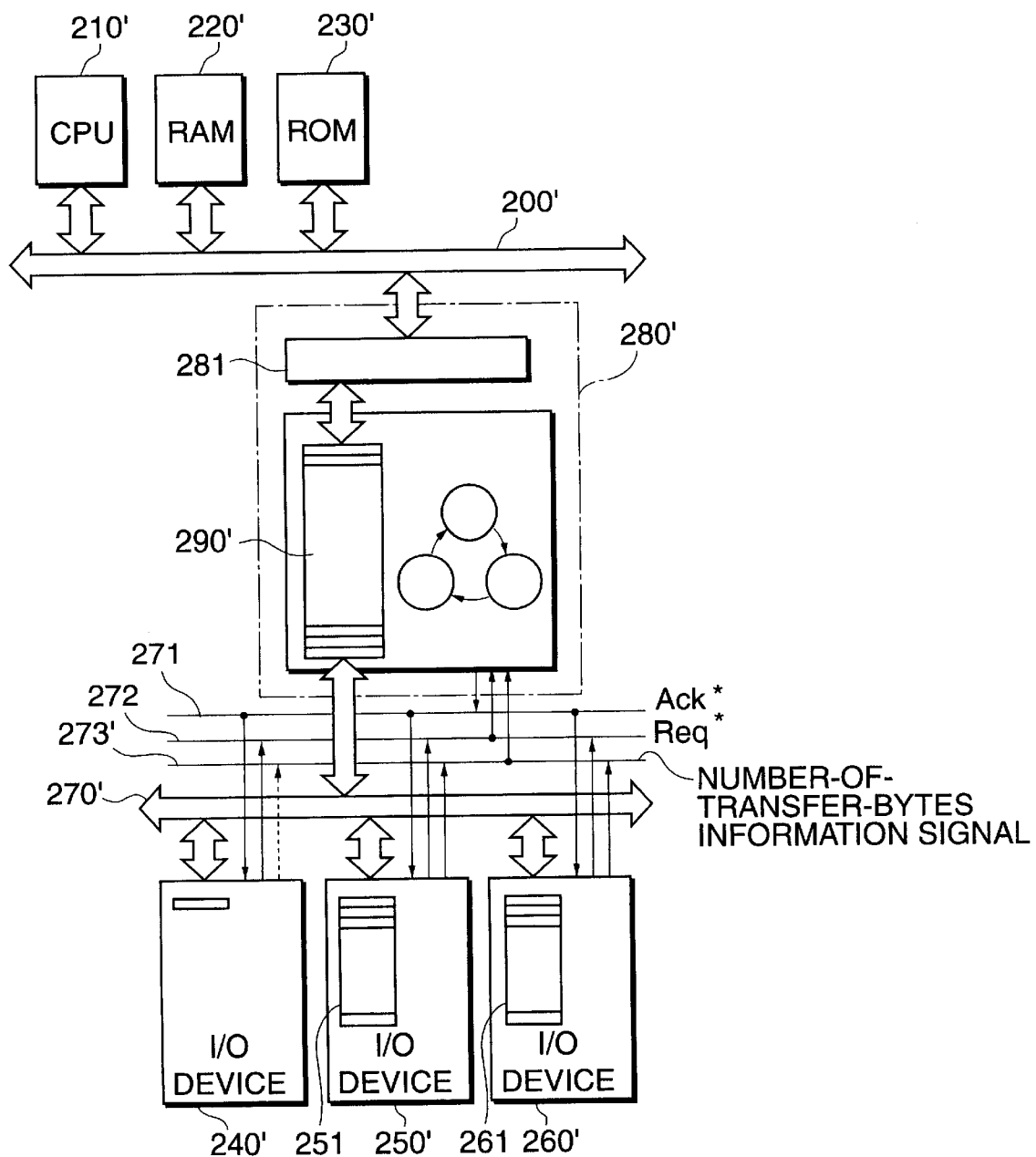
FIG. 10 is a diagram showing the arrangement of main parts of a DMA controller according to a second embodiment of the invention, in relation to peripheral devices connected thereto.

FIG. 10 is a diagram showing the arrangement of main parts of a DMA controller according to a second embodiment of the invention, in relation to peripheral devices connected thereto. In FIG. 10, all component elements that are substantially the same as those shown in FIG. 1 are indicated by the same reference numerals used in the description of the first embodiment, and the details of them are omitted from the following description.

A feature of the second embodiment lies in the provision of a signal line 273'. The signal line 273' is provided for a signal indicative of information on the numbers of bytes to be transferred (a number-of-transfer-bytes information signal), and is composed of a number of signal lines sufficient for indicating the full capacity of the FIFO memory 290'. In the second embodiment, since the capacity of the FIFO memory 290' is assumed to be 2 words (8 bytes), the number-of-transfer-bytes information signal 273' is composed of three parts (3 bits), which can express a byte range from 1 byte (000) to 8 bytes (111).

Of the I/O devices 240', 250' and 260', the I/O device 240' has a low access speed. The I/O devices 250' and 260' have high access speeds and have buffers.

Figure 11:
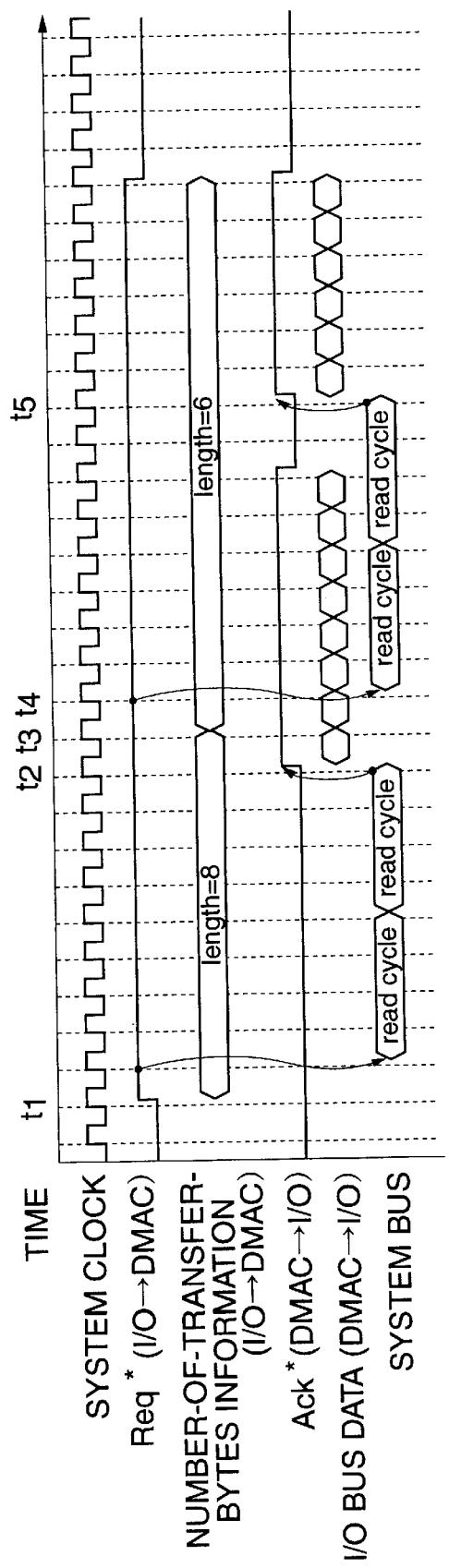
FIG. 11 is a timing chart showing data transfer made from a main storage to an I/O device operating at a high speed, in the second embodiment.

FIG. 11 is a timing chart showing the DMA transfer of data in a case where the direction of data transfer is from the main storage 220' to the high-speed I/O device 250' (or the I/O device 260', which is arranged also in the same manner as shown in FIG. 11).

In this case, data of 14 bytes is read out from the main storage 220' and is sent to the I/O device 250' through the DMA controller 280' to be outputted to the outside from the I/O device 250'.

Referring to FIG. 11, at a time point t1, the I/O device 250' asserts the signal Req* (272) requesting the DMA data transfer and, at the same time, designates the number of "8 bytes", which indicates the full capacity of the FIFO memory 290', by means of the number-of-transfer-bytes information signal 273'. Since the FIFO memory 290' is vacant at this time, the DMA controller 280' reads data of two words serially from the main storage 220' through the system bus 200' and stores the data into the FIFO memory 290'. Beginning at a time point t2, continuously for a period of 8 cycles, the DMA controller 280' drives the data onto the I/O bus 270' serially from data (8 bits) of lower order address in the main storage 220', while asserting the signal Ack* (271) to the I/O device 250'.

When the I/O device 250' recognizes the signal Ack* (271) at the next rising edge of the clock signal (at a time point t3), the I/O device 250' serially takes in the data driven on the I/O bus 270' continuously for a subsequent period of 8 cycles to store the data into the FIFO memory 251 which is disposed inside the I/O device 250'. Since data of 8 bytes thus received is insufficient, the I/O device 250' continues to assert the signal Req* (272) and instructs the DMA controller 280', by means of the number-of-transfer-bytes information signal 273', to transfer the remaining data of 6 bytes.

Since the signal Req* (272) continues to be asserted even after the time point t3, the DMA controller 280' again reads data of 6 bytes designated by the number-of-transfer-bytes information signal 273' from the main storage 220' through the system bus 200' and stores the data into the FIFO memory 290'. After that, the DMA controller 280' serially drives onto the I/O bus 270' the data, beginning from data of lower order address in the main storage 220', one byte per cycle, continuously for a period of 6 cycles from the time point t4, while asserting the signal Ack* (271) to the I/O device 250'. Then, when the I/O device 250' recognizes the signal Ack* (271) at the next rising edge of the system clock signal (at a time point t5), the I/O device 250' takes in the data driven on the I/O bus 270' continuously for a period of 6 cycles and stores the data into the internal FIFO memory 251.

With the data transfer arranged to be made in the above-mentioned manner, data of 8 bytes can be transferred between the DMA controller 280' and the I/O device 250' within a period of 10 cycles, with the maximum number of bytes to be transferred at a time set at "8". Therefore, the transfer rate in this case becomes "(I/O bus width=8 bytes)× (system clock signal frequency)×⅘".

Figure 12:
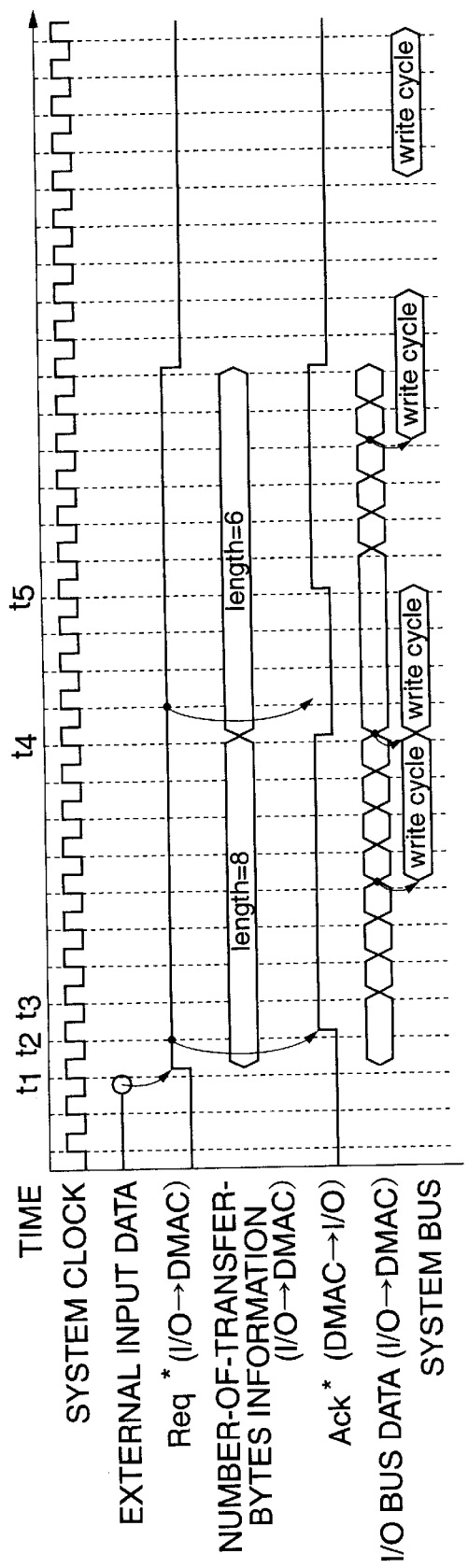
FIG. 12 is a timing chart showing data transfer made from the I/O device operating at a high speed to the main storage, in the second embodiment.

FIG. 12 is a timing chart showing the DMA transfer of data in a case where the direction of data transfer is from the I/O device 250' to the main storage 220'. In the case of FIG. 12, data of 14 bytes is received from outside and is written into the main storage 220' through the DMA controller 280'.

Referring to FIG. 12, when a packet of data of 14 bytes is received from outside, the I/O device 250' asserts the signal Req* (272) requesting the DMA data transfer at a time point t1, and designates a transfer length "8" by means of the number-of-transfer-bytes information signal 273'. At the same time, the I/O device 250' reads foremost data of one byte from the FIFO memory 251 and drives the data onto the I/O bus 270'. Then, since the FIFO memory 290' is empty at this time, the DMA controller 280' asserts the signal Ack* (271) to the I/O device 250' continuously for a period of 8 cycles beginning from the next rise of the clock signal (from a time point t2). At the same time, the DMA controller 280' takes in the data driven on the I/O bus 270' and stores the data into the FIFO memory 290'.

When the I/O device 250' recognizes the signal Ack* (271) at the next rise of the clock signal (at a time point t3), the I/O device 250' drives the data stored in the FIFO memory 251 onto the I/O bus 270' serially from the foremost part of the data, one byte at a time, continuously from the next cycle over a period of 7 cycles. Then, the DMA controller 280' serially stores the data from the I/O bus 270' into the FIFO memory 290'. When the amount of data stored in the FIFO memory 290' comes to exceed four bytes (one word), the DMA controller 280' writes the data into the main storage 220', one word at a time, beginning from the foremost part of the FIFO memory 290', through the system bus 200'.

Upon recognizing an asserted state of the signal Ack* (271) for the eighth cycle at a time point t4, the I/O device 250' continues to assert the signal Req* (272), as there still remains data of 6 bytes in the FIFO memory 251, and designates "6" for the next transfer length by means of the number-of-transfer-bytes information signal 273'. Then, since there is a vacancy for 6 bytes or more in the FIFO memory 290' at a time point t5, the DMA controller 280' asserts the signal Ack* (271) to the I/O device 250' continuously over a period of 6 cycles from this point of time.

The DMA controller 280' reads out data from the FIFO memory 290' and writes the data into the main storage 220' when the content of the FIFO memory 290' comes to exceed 4 bytes. In this case, however, data of 2 bytes eventually remains untransferred in the FIFO memory 290'.

Then, the data remaining in the FIFO memory 290' is written into the main storage 220' by carrying out either of the following methods (i) and (ii).

(i) The I/O device 250' gives an instruction directly to the DMA controller 280' after transmitting the last data.

(ii) After the DMA transfer for a number of times predetermined by the CPU 210' is finished, the CPU 210' gives an instruction to the DMA controller 280'.

On the other hand, in a case where the DMA transfer of data is made between the main storage 220' and the low-speed I/O device 240', the number-of-transfer-bytes information signal 273' is fixed to "1" by means of a selection circuit provided in the DMA controller 280'. That arrangement permits the DMA transfer to be carried out in the same manner as the conventional arrangement, without any additional circuit.

In the case of the second embodiment, the signal Ack* (271) is continuously asserted for a period of cycles designated by the number-of-transfer-bytes information signal 273' and, after that, a period of at least one cycle is provided before the signal Ack* (271) is next asserted. However, this arrangement may be changed to continuously assert the signal Ack* (271) including the next period of cycles designated by the number-of-transfer-bytes information signal 273', without once negating the signal Ack* (271), if the capacity of the FIFO memory 290' or the read/write cycle of the system bus 200' permits such an arrangement.

Further, in the case of the second embodiment, a plurality of I/O devices are connected to one channel of the DMA controller through the I/O bus. However, the number of I/O devices connected of course may be changed to one.

As has been described above, according to the first and second embodiments, even in a case where data transfer is to be made by performing hand shaking between the DMA controller and the I/O device, a transfer rate higher than the rate of "(I/O bus width)×(system clock signal frequency)×½" can be obtained. Therefore, even in a case where a high-speed I/O device is connected to the DMA controller, the transfer never has a bottleneck. The arrangement thus permits not only a reduction in capacity of the FIFO memory required on the side of the I/O device but also attainment of adequate performance.

Further, the first and second embodiments are arranged to have a mode of transferring data of one byte concurrently with asserting the signal Ack* once as in the conventional arrangement. This mode enables data of any fractional amount less than the number of transfer bytes for burst transfer to be transferred. Besides, in a case where a low-speed I/O device is connected to the DMA controller, the arrangement obviates the necessity of providing the I/O device with any unnecessary FIFO memory.

Further, according to the first and second embodiments, it becomes possible to perform data transfer in a manner most apposite to a device connected to the I/O bus according to the kind of the device.

Further, according to the first and second embodiments, it becomes possible to adaptively realize a transfer rate of the I/O bus apposite to the transfer speed of each of the I/O devices.

According to the arrangement of each of the fist and second embodiments described in the foregoing, the data transfer rate between the I/O bus and the system bus can be adaptively optimized according to the kind of the device connected to the I/O bus.

Although the invention has been described in its preferred form with a certain degree of particularity, many apparently widely different embodiments of the invention can be made without departing from the spirit and the scope of the invention. It is to be understood that the invention is not limited to the specific embodiments thereof except as defined in the appended claims.

What is claimed is:

1. A DMA controller arranged to transfer data between a main storage connected to a system bus and an I/O device connected to an I/O bus, said DMA controller comprising:
   an FIFO memory arranged to buffer a difference in transfer speed between said system bus and said I/O bus;
   first transfer means for transferring data between said main storage and said FIFO memory through said system bus;
   request receiving means for receiving from said I/O device a request for transfer by DMA;
   second transfer means for transferring data of by every one transfer unit between said FIFO memory and said I/O device through said I/O bus when a request for normal transfer by DMA is received by said request receiving means; and
   third transfer means for continuously transferring data by a predetermined number of transfer units between said FIFO memory and said I/O device through said I/O bus when a request for continuous transfer by DMA is received by said request receiving means,
   wherein if a remainder of data to be transferred becomes less than the predetermined number of transfer units during a transfer by the predetermined number of transfer units by said third transfer means, the remainder of data is transferred by every one transfer unit by said second transfer means.

2. A DMA controller according to claim 1, wherein said request receiving means receives the request for normal transfer and the request for continuous transfer through a plurality of request signal lines.

3. A DMA controller according to claim 2, wherein said request receiving means decides the received request for transfer to be the request for normal transfer if a signal is asserted through a first request signal line but a signal is not asserted through a second request signal line, and to be the request for continuous transfer if signals are asserted through the first and second request signal lines.

4. A DMA controller according to claim 2, wherein said request receiving means decides the received request for transfer to be the request for normal transfer if a signal is asserted through a first request signal line, and to be the request for continuous transfer if a signal is asserted through a second request signal line.

5. A DMA controller according to claim 2, wherein said request receiving means receives a request for transfer through a first request signal line, and receives a request for a number of transfer units for continuous transfer through a second request signal line.

6. A DMA controller according to claim 5, wherein said predetermined number of transfer units is the requested number of transfer units for continuous transfer.

7. A DMA controller according to claim 1, wherein, in a case where a direction of transfer indicated by said request for transfer is from said main storage to said I/O device, data of said predetermined number of transfer units is transferred from said main storage to said FIFO memory by said first transfer means prior to transfer by said third transfer means.

8. A DMA controller according to claim 1, wherein, in a case where a direction of transfer indicated by said request for transfer is from said I/O device to said main storage, when an amount of data corresponding to a bus width of said system bus has been stored in said FIFO memory, said data is transferred to said main storage by said first transfer means.

9. A DMA controller according to claim 1, wherein a plurality of I/O devices are connectable to said I/O bus.

10. A DMA controller according to claim 9, wherein said second and third transfer means transfer data respectively with the same data widths as those of all said I/O devices connected to said I/O bus.

11. A control method for a DMA controller arranged to transfer data between a main storage connected to a system bus and an I/O device connected to an I/O bus through an FIFO memory arranged to buffer a difference in transfer speed between said system bus and said I/O bus, said control method comprising:

a first transfer step of transferring data between said main storage and said FIFO memory through said system bus;

a request receiving step of receiving from said I/O device a request for transfer by DMA;

a second transfer step of transferring data by every one transfer unit between said FIFO memory and said I/O device through said I/O bus when a request for normal transfer by DMA is received in said request receiving step; and a third transfer step of continuously transferring data by a predetermined number of transfer units between said FIFO memory and said I/O device through said I/O bus when a request for continuous transfer by DMA is received in said request receiving step, wherein if a remainder of data to be transferred less than the predetermined number of transfer units during a transfer by the predetermined number of transfer units in said third transfer step, the remainder of data is transferred by every one transfer unit.

12. A control method according to claim 11, wherein, in said request receiving step, the request for normal transfer and the request for continuous transfer are received through a plurality of request signal lines.

13. A control method according to claim 12, wherein, in said request receiving step, the received request for transfer is decided to be the request for normal transfer if a signal is asserted through a first request signal line but a signal is not asserted through a second request signal line, and to be the request for continuous transfer if signal s are asserted through the first and second request signal lines.

14. A control method according to claim 12, wherein, in said request receiving step, the received request for transfer is decided to be the request for normal transfer if a signal is asserted through a first request signal line, and to be the request for continuous transfer if a signal is asserted through a second request signal line.

15. A control method according to claim 12, wherein, in said request receiving step, a request for transfer is received through a first request signal line, and a request for a number of transfer units for continuous transfer is received through a second request signal line.

16. A control method according to claim 15, wherein said predetermined number of transfer units is the requested number of transfer units for continuous transfer.

17. A control method according to claim 11, wherein, in a case where a direction of transfer indicated by said request for transfer is from said main storage to said I/O device, data of said predetermined number of transfer units is transferred from said main storage to said FIFO memory by said first transfer step prior to transfer by said third transfer step.

18. A control method according to claim 11, wherein, in a case where a direction of transfer indicated by said request for transfer is from said I/O device to said main storage, when an amount of data corresponding to a bus width of said system bus has been stored in said FIFO memory, said data is transferred to said main storage by said first transfer step.

19. A control method according to claim 11, wherein a plurality of I/O devices are connectable to said I/O bus.

20. A control method according to claim 19, wherein, in said second and third transfer steps, data is transferred respectively with the same data widths as those of all said I/O devices connected to said I/O bus.

* * * * *

UNITED STATES PATENT AND TRADEMARK OFFICE
CERTIFICATE OF CORRECTION

PATENT NO. : 6,651,114 B1
DATED : November 18, 2003
INVENTOR(S) : Toshiaki Minami It is certified that error appears in the above-identified patent and that said Letters Patent is hereby corrected as shown below:

Column 8,
Line 17, delete "2901" and insert -- 290' --.

Column 12,
Line 14, delete "data of by a" and insert -- data by a --.

Column 14,
Line 4, delete "signal s" and insert -- signals --.

Signed and Sealed this

Twenty-first Day of February, 2006

JON W. DUDAS
*Director of the United States Patent and Trademark Office*